UNITED STATES PATENT OFFICE.

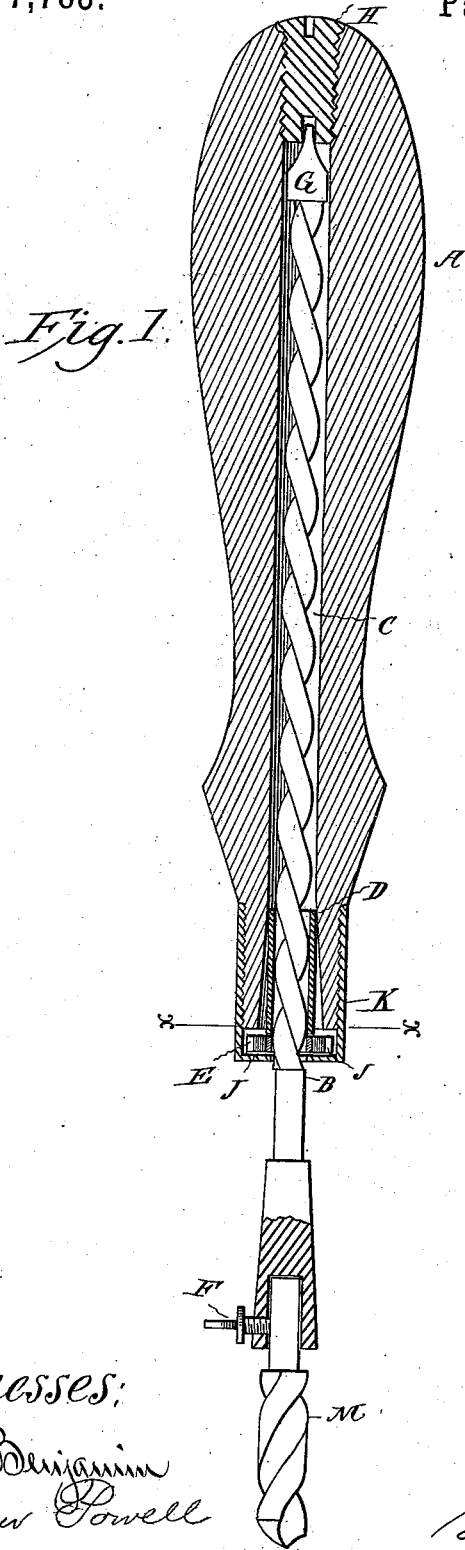

GEORGE FREDERICK SHAVER, OF NEW YORK, N. Y., ASSIGNOR TO THE SHAVER CORPORATION, OF SAME PLACE.

ROTARY TOOL-DRIVER.

SPECIFICATION forming part of Letters Patent No. 377,783, dated February 14, 1888.

Application filed September 3, 1887. Serial No. 248,707. (No model.)

*To all whom it may concern:*

Be it known that I, GEORGE FREDERICK SHAVER, a citizen of the United States, and a resident of New York city, in the county of New York and State of New York, have invented certain new and useful Improvements in Rotary Tool-Drivers, of which the following is a specification.

The object of my invention is to provide means for holding rotary tools—such as bits, drills, awls, and screw-drivers—and operating them by a straight thrust of the hand, instead of the ordinary rotary movement. The means I employ to effect this result is shown in the accompanying drawings, in which—

Figure 1 represents a longitudinal section drawn through the center of the tool, and Fig. 2 represents a cross section at the line X X, Fig. 1.

A handle, A, Fig. 1, is bored through the center from end to end to admit the twisted driving-shaft B, which rests loosely within the chamber C, limiting-sleeve D, and eccentric-pin clutch E. The tool to be used is held in place by an ordinary socket and thumb-screw, F, rigidly attached to the end of the spiral driving-shaft B, Fig. 1. The opposite end of the driving-shaft is fitted with a detaining-wedge, G, which, when the handle is forced down, engages with a slotted screw, H. A sleeve D is placed about the spiral driving-shaft to prevent wear of the handle and to keep the shaft B from dropping out of the handle A. A clutch, E, is fitted loosely over the spiral driving-shaft B, and is provided with eccentric-lugs I I I I and roller-pins J J J J, resting within the points of the lugs, the whole being confined in place by the ferrule K.

The driving-shaft B, Fig. 1, is controlled in its rotation entirely by the position of the roller pins J J J J, which are either thrown outward and are caught between the ends of the lugs or inclined planes of the clutch E, Fig. 2, and the fixed ferrule K, when the handle is pressed downward, thus fixing the clutch solidly to the handle and forcing the spiral driving-shaft to turn around as it passes through a square hole in the center of the clutch, or when the handle is being raised the driving-shaft remains stationary, and the clutch, revolving in the opposite direction, loosens the friction-pins J J J from their engagement with the ferrule K, and the pins roll down the inclined lugs I I I I toward the center of the clutch, which is then free to rotate until the handle is again depressed, when the action is repeated.

The action of the driving mechanism is as follows: When the handle A is raised, the spiral driving-shaft B is withdrawn by the force of gravity, but without turning, as the clutch E is free to turn in the direction of the arrow L, Fig. 2, and the action of the dropping spiral shaft is simply to turn the clutch E about on its axis. When the handle A is depressed, the motion of the clutch E, Fig. 2, is reversed by the spiral, and the clutch then tends in the direction opposite to that shown by the arrow L, Fig. 2, and this action causes the roller-clutch pins J J J J to be thrown out of their natural position, where they are caught between the lugs of the clutch E and the ferrule K, thus making the clutch fixed with relation to the handle A, and the continued depression of the handle and fixed clutch, sliding upon the spiral driving-shaft B, causes the same to turn around and so operate the tool M.

The wedge G and slotted screw H are used only when the handle A is depressed and to enable the spiral driving-shaft B to be reversed and the tool withdrawn.

What I claim as new, and desire to secure by Letters Patent, is—

The tool-driving handle A, ferrule K, and driving shaft B, in combination with the rotating clutch E, composed of an apertured shaft-carrying wheel with angular lugs I I I I, disposed upon its periphery and recessed to support friction-pins J J J J, arranged to engage with the ferrule K when the handle is depressed and to disengage when raised, substantially as herein set forth and described.

Signed at New York city, in the county of New York and State of New York, this 31st day of August, A. D. 1887.

GEORGE FREDERICK SHAVER.

Witnesses:
LEWIS HURST,
ANDREW POWELL.